June 29, 1965 F. A. HIERSCH 3,191,377
TURBO-JET FAN MUFFLER
Filed Dec. 11, 1961 3 Sheets-Sheet 1

INVENTOR.
Frederick A. Hiersch
BY
*Hanke + Hanke*
ATTORNEYS

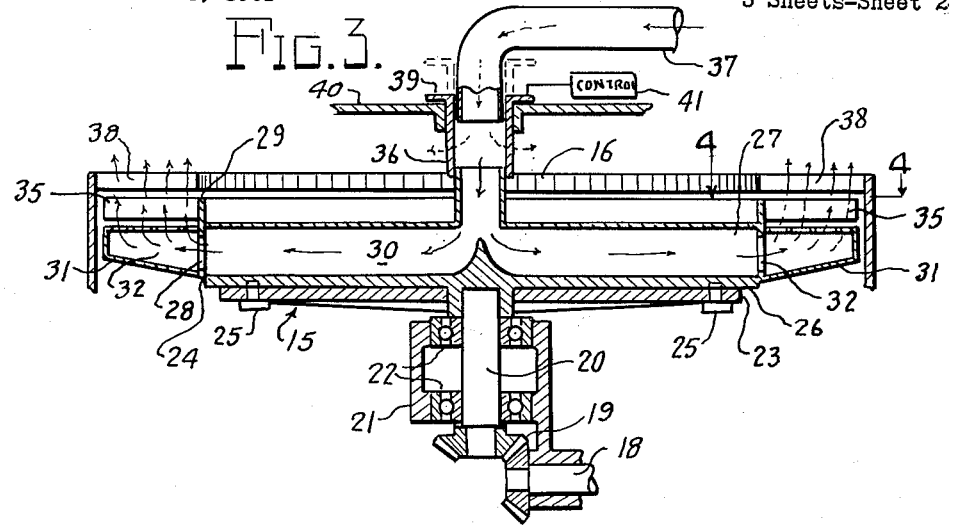
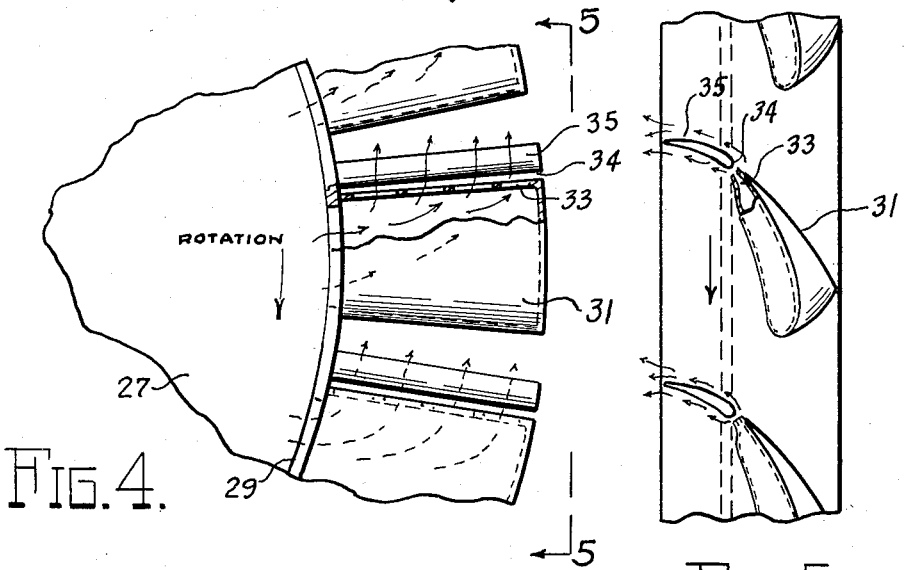
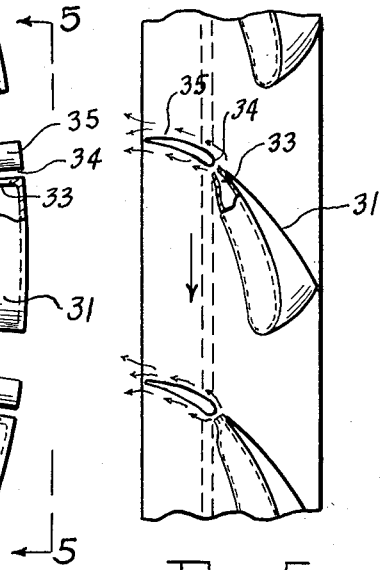

June 29, 1965  F. A. HIERSCH  3,191,377
TURBO-JET FAN MUFFLER
Filed Dec. 11, 1961  3 Sheets-Sheet 3
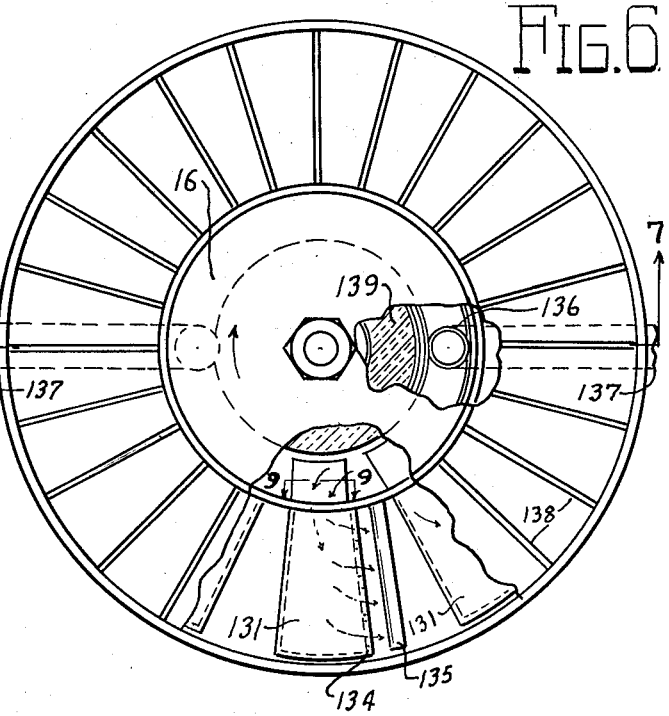
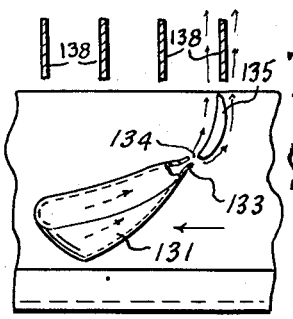
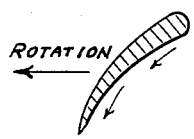
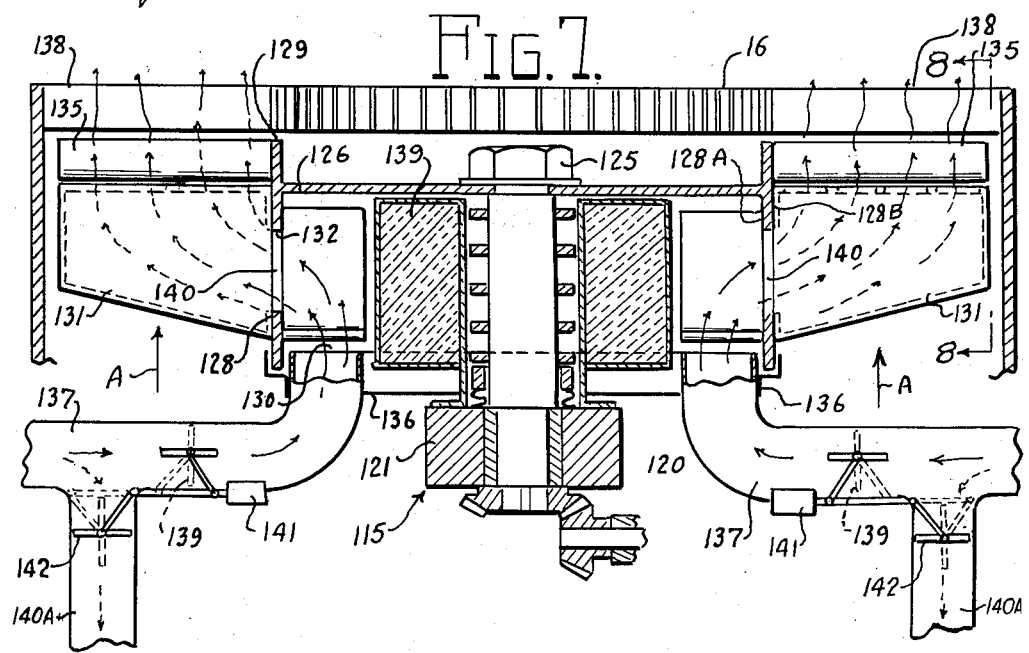
INVENTOR
BY *Frederick A. Hiersch*
ATTORNEYS

United States Patent Office 3,191,377
Patented June 29, 1965

3,191,377
TURBO-JET FAN MUFFLER
Frederick A. Hiersch, Detroit, Mich., assignor to Continental Aviation and Engineering Corporation, Detroit, Mich., a corporation of Virginia
Filed Dec. 11, 1961, Ser. No. 158,521
1 Claim. (Cl. 60—13)

This invention relates to a fan assembly for internal combustion engines and more particularly to a combination fan assembly and muffler in which exhaust gases are utilized to provide rotative force and at the same time to increase the lift coefficient of the fan blades.

Recent aerodynamic research has shown that the lift coefficient of an airfoil can be substantially increased by controlling airflow in the boundary layer about the surface of the airfoil. Boundary-layer control, to produce such a result, can be in the form of porous surfaces, suction slots, special attachments or other devices which remove the boundary layer from the surface, improve its stability, or otherwise alter its characteristics. If the airfoil has a flap, the tendency of the airflow to separate over the rear of the flap tends to limit the increase in lift which would otherwise result from the use of the flap. Preventing this separation is a form of boundary layer control which substantially restores the lift characteristics of an airfoil-flap combination. Heretofore no one has made use of this knowledge to produce a more efficient fan assembly.

It is an object of the present invention to increase the efficiency of cooling fans for internal combustion engine by providing a fan assembly which utilizes boundary-layer control to increase the lift coefficient of the fan blades.

Another object is to produce a fan blade with increased lift characteristics by providing means which prevent the separation of airflow over the surface of the blade.

Still another object of the present invention is to substantially reduce the amount of horsepower necessary to operate the cooling fan of an internal combustion engine by providing a fan assembly with increased lift characteristics and which is driven in part by exhaust gases.

Yet another object is to produce a more efficient internal combustion engine by providing means for recovering some of the energy ordinarily lost with the exhaust gases.

Still a further object of the present invention is to reduce the number of parts necessary for an internal combustion engine by combining the cooling fan and the muffler into a single unit.

Yet a further object of the present invention is to produce an automatic regulating fan assembly in which the flow of cooling air is increased proportionately as the speed of the engine is increased and more coolant is needed by providing means which increases the lift coefficient of the fan blades as the engine approaches load conditions.

Other objects and advantages of the present invention will be readily apparent to one skilled in the art to which the invention pertains upon reference to the following drawings in which like reference characters refer to like parts throughout the several views and in which FIG. 1 is a top plan view of an internal combustion engine embodying the present invention.

FIG. 3 is a fragmentary cross-sectional view taken substantially on line 3—3 of FIG. 1.

FIG. 4 is a fragmentary cross sectional view of fan blade structure taken substantially at line 4—4 of FIG. 3.

FIG. 5 is a fragmentary elevational view taken substantially on line 5—5 of FIG. 4.

FIG. 6 is a top elevational view of a fan structure of another preferred embodiment of the present invention.

FIG. 7 is a cross sectional view taken on line 7—7 of FIG. 6.

FIG. 8 is a fragmentary cross sectional view of fan blade structure taken substantially on line 8—8 of FIG. 7 and FIG. 9 is a cross-sectional view of a turbine blade utilized in the embodiment of the present invention illustrated in FIG. 7.

Figure 1:
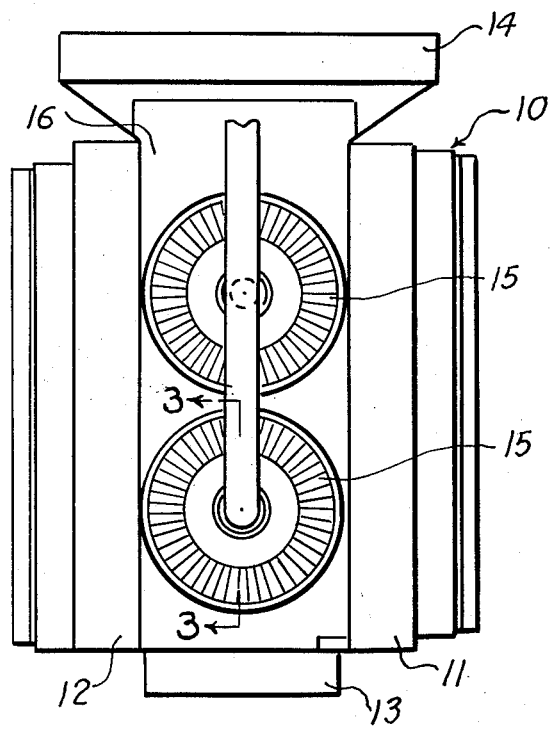
Figure 2:
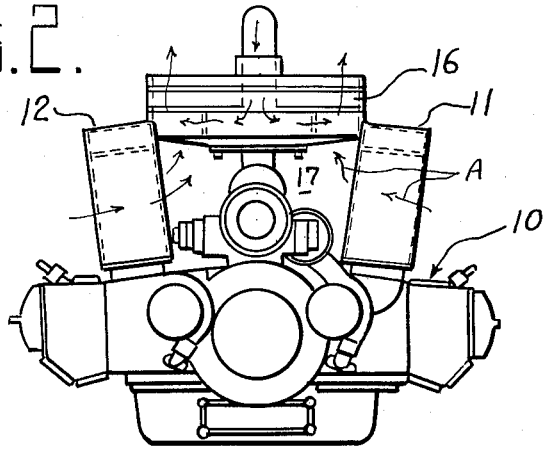
FIG. 2 is an elevational end view of the engine shown in FIG. 1.

A preferred liquid cooled internal combustion engine 10 embodying the present invention is illustrated in FIGS. 1 and 2 as being provided with a pair of substantially vertically disposed side radiators 11 and 12, substantially vertically disposed end radiators 13 and 14, and a pair of cooling air fan assemblies 15 spaced from the engine 10 and between the radiators 11, 12, 13 and 14 and enclosed in a shroud structure 16.

The engine 10, the radiators 11, 12, 13 and 14, and the shroud structure 16 are preferably integrally constructed and arranged to define an intermediate airspace 17 so that cooling air, preferably passing from the atmosphere through the radiators 11, 12, 13 and 14 enters the airspace 17 and is exhausted to the atmosphere through the fan assemblies 15 as indicated by the directional arrows A in FIG. 2.

Referring now to FIG. 3 for a more detailed description of the preferred fan assemblies 15 embodying the present invention a drive shaft 18 adapted for driving connection to the engine 10 acts through beveled gears 19 to rotate a lay shaft 20 rotatably carried in a housing structure 21 by bearings 22. The lay shaft 20 preferably rotatably carries an annular plate 23. The plate 23 is secured to a drum member 24 by screws 25 or other convenient means. The drum member 24 is comprised of a pair of disc shaped members 26–27 spaced by a peripheral edge portion 28 having an extended flange portion 29. The disc members 26–27 and the peripheral edge portion 28 are formed to define a central chamber 30.

A plurality of hollow fan blades 31 are annularly disposed on the peripheral edge portion 28 of the drum member 24. Openings 32 in the peripheral edge portion 28 provide communication between the chamber 30 and the interior of the fan blades 31. Each fan blade 31 has a trailing edge portion 33 as can best be seen in FIG. 5 provided with slots 34. A plurality of vane elements 35 are carried on the flange portion 29. Each of the vane elements 35 is disposed in a position which aligns with a corresponding fan blade 31 as can best be seen in FIG. 5.

The shroud structure 16 is provided with an exhaust hub inlet 36 providing communication between an exhaust manifold duct 37 and the central chamber 30. The shroud structure 17 is further provided with a plurality of guide vanes 38 which are annularly spaced from the exhaust hub inlet 36 and radially disposed to coincide with the fan blades 31 and the vane elements 35.

In operation exhaust gases enter the hub inlet 36, pass through the chamber 30, through the hollow blades 31 and are ejected through the slots 34 over the surface of the vane elements 35. This is indicated by the arrows provided in FIG. 5. In this way the separation of airflow which would ordinarily occur as the air passes over the vane elements 35 is substantially diminished and the lift coefficient of the fan assembly is appreciably increased. The resultant boundary layer control then has the effect of increasing the amount of cooling air which can be pulled through the radiators 11, 12, 13 and 14 at any given speed. Since the increase in lift coefficient is directly proportional to the amount of exhaust gases flowing over the vane elements 35 an automatic cooling system regulator has been provided. As engine speed increases and requires more cooling air, exhaust also increases providing a greater lift coefficient for the blades 31 and vanes 35. Also the present invention increases efficiency of operation by utilizing the exhaust gases to help rotate the fan blades 31 through use of reaction forces. At the same time, an effective exhaust muffler is provided without additional parts being necessary.

In the embodiment of the present invention illustrated in FIGS. 6–9, the shroud structure 16 encompasses a fan assembly 115 comprising a substantially drum shape member 124 secured to a shaft 120 by a nut 125 or similar means. The shaft 120 is rotatably carried in a housing structure 121 having an annular sealing portion 139. The drum member 124 comprises an upper plate 126 having a peripheral edge portion 128 provided with an extended flange portion 129 and an inner face 128A and an outer face 128B. The plate 126, the peripheral edge portion 128 and the sealing portion 139 define an annular chamber 130. Exhaust inlet hubs 136 provide communication between exhaust gas manifold ducts 137 and the chamber 130. Turbine blades 140 are annularly spaced about the inner face 128A of the peripheral edge portion 128 and are disposed to radially extend into the chamber 130. Hollow fan blades 131 are carried on the outer face 128B of the peripheral edge portion 128 in an annularly spaced relationship. Openings 132 in the peripheral edge portion 128 provide communication between the chamber 130 and the interior portion of the fan blades 131. Each fan blade 131 has a trailing edge 133 which is provided with slots 134. The flange portion 129 carries annularly spaced vane elements 135. Each of the vane elements 135 is radially disposed in an aligning position with a corresponding fan blade 131 as can best be seen in FIG. 8. The shroud 16 is provided with a plurality of guide vanes 138 disposed above the fan blades 131 and the vane elements 135.

This preferred embodiment operates very similar to the embodiment heretofore described but has the added advantage of greater power recovery from exhaust gases by reason of the use of the turbine blades 140.

FIGS. 3 and 7 illustrate diagrammatically control devices which may be used to regulate the flow of exhaust gases into the turbo-jet fan muffler of the present invention and thus to control the lift coefficient of the blades and the cooling action of the fan. FIG. 3 shows a flanged sleeve 39 slidably carried in a bypass casing 40. A control device 41 is connected by any preferred means to the sleeve 39 and is operable to move the sleeve 39 from the position illustrated in FIG. 3 selectively to the dotted line position illustrated therein. Positions intermediate the position shown and the dotted line position permit exhaust gases to bypass the fan in controlled amounts and thus permit regulation of the cooling capacity of the fan.

In FIG. 7 thermostatic control devices 141 preferably operate a pair of butterfly valves 139–142 to direct the exhaust gases into the fan when the engine is heated and the added lift coefficient is needed or to direct it through a bypass duct 140A when it is not needed. Again intermediate positions of the butterfly valves 139–142 between fully closed and fully open permit controlled amounts of exhaust gases to flow into the fan muffler in response to engine temperatures.

It is apparent from the foregoing description that the present invention provides a fan assembly with greatly increased efficiency of operation. Energy which would otherwise be lost in the exhaust gases is recovered and used to help rotate the fan. The increased lift coefficient created by boundary layer control provides an assembly which will move more air at any given fan speed. At the same time the combination of a fan and muffler in a single compact unit promotes simplicity in the overall construction of an internal combustion engine.

I claim:

In combination with an internal combustion engine having an exhaust manifold, a combination muffler and fan assembly comprising (a) a drum member having a central chamber and being rotatably carried on said engine,
(b) a plurality of hollow fan blades carried by said drum member,
(c) each of said fan blades having a trailing edge portion provided with an opening,
(d) means rotating said blades to produce cooling air flow,
(e) means directing the flow of exhaust gases from said exhaust manifold through said chamber and through said hollow blades for exhaust through said openings whereby to provide a muffler for the exhaust gases and to utilize said exhaust gases to contribute to the rotation of said drum member,
(f) a plurality of vane elements each being disposed closely adjacent to the trailing edge of a corresponding fan blade and located for boundary layer control,
(g) means securing said vane elements to said fan blades whereby they will rotate together,
(h) a shroud structure carried on said engine and housing said muffler-fan assembly, said shroud structure being provided with air entering means disposed adjacent said fan blades and exhaust gas-air exiting means disposed closely adjacent said vane elements,
(i) said exhaust gas-air exiting means being provided with a plurality of radially disposed guide vane elements, and
(j) said rotating means including means drivingly connecting said fan assembly and said engine.

References Cited by the Examiner

UNITED STATES PATENTS

| | | | |
|---|---|---|---|
| 2,372,030 | 3/45 | Stalker | 170—135.4 |
| 2,573,544 | 10/51 | Colby | 60—13 |
| 2,701,682 | 2/55 | Dallenbach et al. | 230—116 |
| 2,730,861 | 1/56 | Buchi | 60—13 |
| 2,897,802 | 8/59 | Haas | 123—41.49 |

JULIUS E. WEST, *Primary Examiner.*